Feb. 18, 1941. J. W. LEIGHTON 2,232,397
INDIVIDUAL WHEEL SPRINGING
Filed Nov. 23, 1937 2 Sheets-Sheet 1
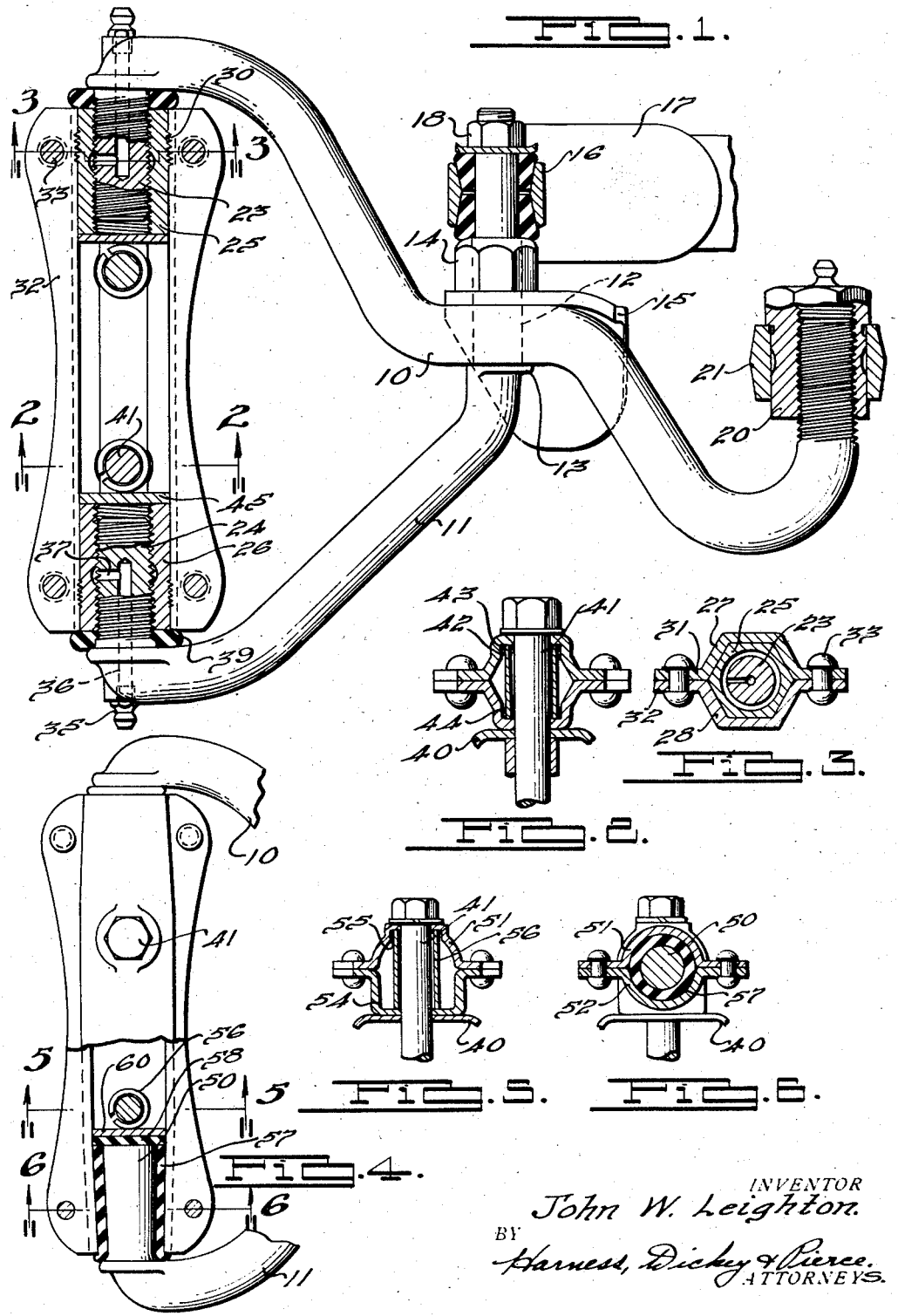
INVENTOR
John W. Leighton.
BY Harness, Dicky & Pierce.
ATTORNEYS.

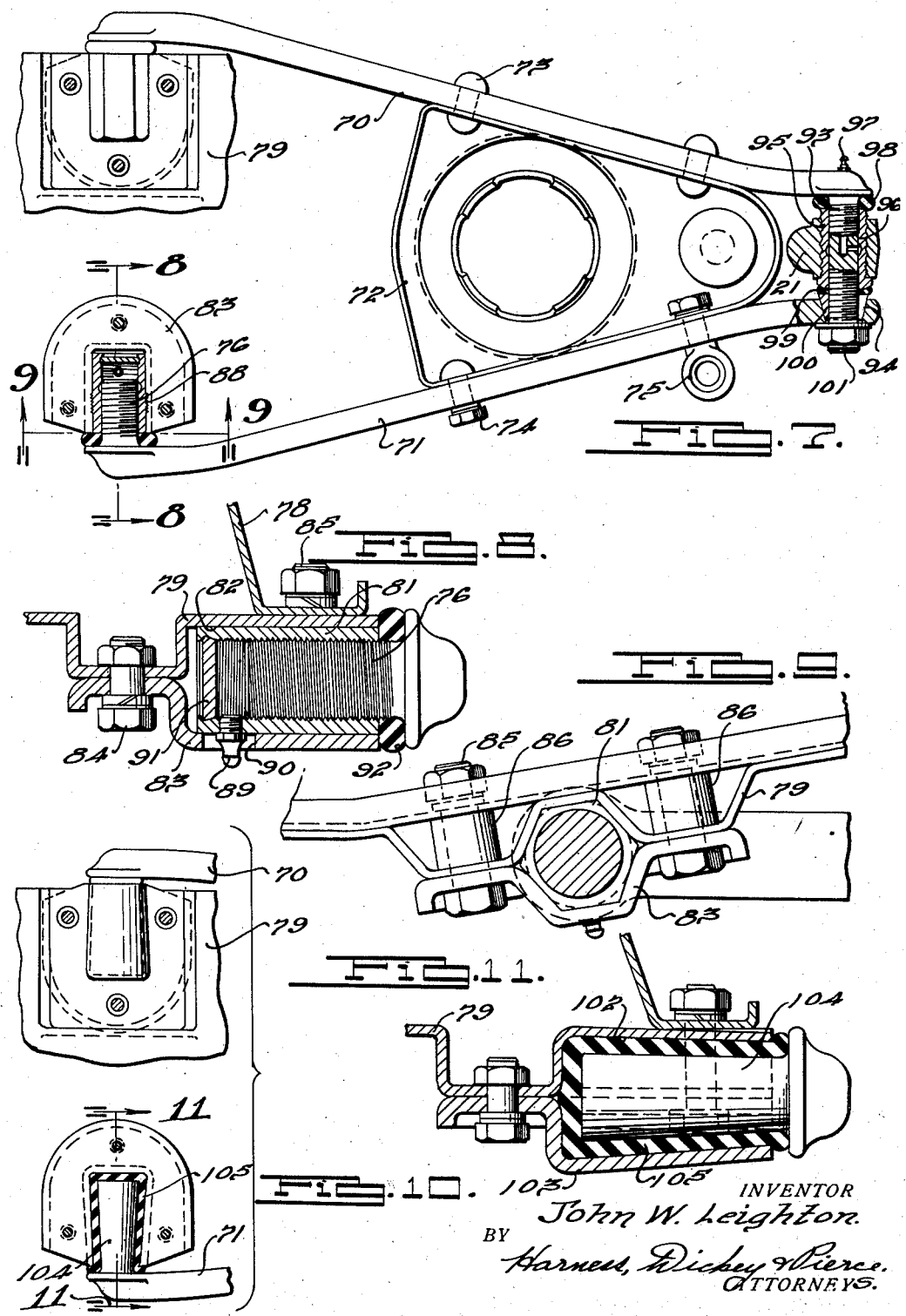

Patented Feb. 18, 1941

2,232,397

UNITED STATES PATENT OFFICE

2,232,397

INDIVIDUAL WHEEL SPRINGING

John W. Leighton, Port Huron, Mich.

Application November 23, 1937, Serial No. 176,088

15 Claims. (Cl. 267—20)

This invention relates to motor vehicles and it has particular relation to improvements in individual springing for the wheels of the vehicle.

One general object of the invention is to provide improvements in individual springing which will be less expensive to manufacture and to assemble while at the same time providing individual springing which is durable and highly efficient in use.

Another and more specific object of the invention is to provide an improved pivotal connection between the arm of an individual springing and the vehicle frame, which can be formed from sheet metal so as to reduce the cost of construction and also to facilitate assembly.

Another object of the invention is to provide an improved pivotal connection such as last mentioned wherein part of the piovtal connection is formed by shaping a part of the chassis frame of the vehicle so as to thereby reduce the number of parts required.

Another object of the invention is to provide an improved pivotal connection including a rubber bushing wherein the rubber bushing is held in place, and against undesirable axial movement, by an arrangement which increases the efficiency of the bushing.

Another object of the invention is to provide an improved pivotal connection employing threaded pivotal bearings, wherein shaped sheet metal members are employed to hold internally threaded bushings in place.

Another object of the invention is to provide an improved pivotal connection of the threaded bearing type wherein a less expensive arrangement is employed for lubricating the bearings.

Another object of the invention is to provide an improved arm arrangement for individual springing having threaded bearings at the inner and at the outer ends of the arm wherein improved means are employed for aligning the threads at both ends of the arm so as to avoid binding.

Other objects of the invention will become apparent from the following specification, from the drawings, and from the claims hereinafter set forth.

For a better understanding of the invention, reference may be had to the drawings forming a part of the specification, wherein:

Figure 1 is a top plan view partly in cross section, illustrating an upper arm of an individual springing as constructed according to one form of the invention;

Fig. 2 is a cross-sectional view taken substantially along the line 2—2 of Fig. 1;

Fig. 3 is a cross-sectional view taken substantially along the line 3—3 of Fig. 1;

Fig. 4 is a fragmentary plan view similar to Fig. 1, illustrating an upper arm as constructed according to another form of the invention;

Fig. 5 is a cross-sectional view taken substantially along the line 5—5 of Fig. 4;

Fig. 6 is a cross-sectional view taken substantially along the line 6—6 of Fig. 4;

Fig. 7 is a top plan view of the lower arm arrangement of an individual springing as constructed according to one form of the invention;

Fig. 8 is a cross-sectional view on a larger scale taken substantially along the line 8—8 of Fig. 7;

Fig. 9 is a cross-sectional view on a larger scale taken substantially along the line 9—9 of Fig. 7;

Fig. 10 is a fragmentary plan view similar to Fig. 7 illustrating a lower arm as constructed according to another form of the invention; and Fig. 11 is a cross-sectional view on a larger scale taken substantially along the line 11—11 of Fig. 10.

Referring to Fig. 1, the upper arm arrangement illustrated includes arms 10 and 11 projecting laterally from the vehicle frame and connected intermediate the ends of the arm 10 by a portion 12 of the arm 11 projecting through an opening in the arm 10. This portion 12 of arm 11 has an upset portion 13 abutting one side of the arm 10, while at the other side of the latter a nut 14 is threaded on the portion 12 so as to lock the arms together. Between the nut 14 and the arm 10, a bracket element 15 employed as a buffer engaging element, is provided on the portion 12 of the arm 11 while outwardly of the nut 14 an eye member 16 of a shock absorber 17 is connected to the portion 12 and retained in position by means of a nut 18. At its outer end the arm 10 is pivotally threaded into an eccentric bushing 20, which is retained in an eye 21 of a wheel mounting or supporting member. The construction so far described is specifically embodied in and disclosed in my copending application for patent, Serial No. 176,087, filed November 23, 1937.

Referring now to the inner ends of the arms 10 and 11, these arms respectively are provided with externally threaded trunnions 23 and 24 respectively, which have pivotal, threaded bearing engagement with internally threaded bushings 25 and 26 respectively. As best shown by Fig. 3, each of the bushings 25 and 26 is externally of hexagonal shape and is held between upper and lower stampings 27 and 28 that have complementary recesses jointly providing a hexagonal opening for receiving the bushings. As more particularly shown by Fig. 1, each of the bushings has one or more knurled corners, indicated at 30, and these are of such character that when the stampings 27 and 28 are brought together, the knurling bites into the stampings and accordingly, when the stampings are forcefully drawn together, this locks the bushings against axial movement in the hexagonal openings. It will be noted that the stampings have flanges 31 and 32 at each side, and these flanges are connected by means of rivets 33, although it will be apparent that other suitable means may be used for connecting the stampings.

Each threaded bearing is adapted to be lubricated by means of a grease fitting 35 communicating with an opening 36 extending axially of the trunnion and which at its inner end communicates with a radial opening 37 extending to the threaded bearing. A rubber gasket or other sealing ring 39 between the end of each bushing and the arm at the end of the trunnion serves to prevent lubricant from escaping, and also to prevent dirt from entering the bearing.

The assembled stampings are connected to the chassis frame of the vehicle which is indicated at 40 in Fig. 2, by means of fastening bolts 41 extending through vertically aligned openings in the stampings and through the frame. For the purpose of preventing deformation of the upper stamping when the bolts are tightened, split sleeves 42 surround the bolt between the two stampings and serve as spacers at these points. While the stampings jointly provide an opening which is substantially hexagonal in shape throughout its length, such stampings are altered in shape around the bolt openings, as indicated at 43 and 44, so as to provide circular recesses for receiving the ends of the split sleeves 42, and this is desirable particularly so as to locate the sleeves during assembly. It will be noted also that between the end of each of the threaded bushings and each of the split sleeves 42, a disc element 45 is provided between the stampings and these elements are tightly fitted in place so as to prevent lubricant from passing them, and thus provide inner walls for the bushings.

In assembling this arrangement, the bushings are threaded on the trunnions at the inner ends of the arms and then this much of the assembly is located in the lower stamping 28 prior to disposing the upper stamping in place. Then the disc elements 45 and split bushings 42 are disposed in the lower stamping with the sleeves located by the recesses 43 and 44 therefor, and then the upper stamping 27 is disposed over the lower stamping and the rivets 33 are applied. It will be appreciated that the manner of assembly, leaves the threaded bearings free from any binding so that the trunnions may turn freely.

The arrangement shown by Figs. 4, 5, and 6 is much the same as that previously described with the principal exception that instead of using threaded bearings, each of the arms 10 and 11 at its inner end is provided with a smooth trunnion portion 50, that tapers axially to a larger diameter at its inner end. The stampings indicated at 51 and 52 are similarly shaped to provide tapered recess portions for receiving the trunnions, although such stampings are shaped differently in the region of the bolts 41 for two reasons. At these points the lower stamping is provided with a flat structure, indicated at 54, so as to provide a large area of engagement with the frame member 40, and it may be mentioned here that this area of engagement is also provided in the construction shown by Fig. 3 by reason of the fact that the stamping is of hexagonal shape. Also, the upper stamping 51, as shown by Fig. 5, has a circular recess 55 for seating the bushing, indicated at 56. Each of the tapered trunnions 50 is mounted in a rubber bushing 57, and it will be noted that this bushing has an end wall 58 at its inner end which is disposed between the split sleeve 56 and at end disc element 60.

In assembling this arrangement, the bushings first are disposed on the trunnion, and then this part of the assembly is located in the lower stamping 52. Then the end wall element 60 and sleeve 56 are disposed in position and then the upper stamping 51 is applied and the parts riveted in the manner previously described. During this clamping of the stampings together, pressure is placed on the rubber, and due to the axial taper the rubber is placed somewhat under axial compression as well as radial compression. It seems that this arrangement adds to the efficiency and life of the rubber bearing. During pivotal movement of the arms, normally the rubber will only tension circumferentially, that is, it will stretch the amount required to permit the oscillatory movement. If found desirable, the rubber could be cemented or vulcanized to both the stampings and the trunnions.

Referring now to Fig. 7, which shows a lower arm of an individual springing, the construction shown comprises two side arm members 70 and 71 interconnected intermediate their ends by a spring supporting pan 72. It will be noted that rivets 73 connect one side of the pan to the arm 70, while releasable bolts 74 connect the other side of the pan to the arm 71. One of the bolts connecting the pan to the arm 71 has an extension 75 which serves as a jack engaging member. The arms 70 and 71 at their inner ends have integral externally threaded trunnions that project toward each other, and such trunnions are connected to the chassis frame of the vehicle by stampings, one of which forms a part of the framework of the vehicle. The particular type of chassis frame to which reference may be had comprises longitudinal side frame members (not shown) connected at the front by a cross frame member 78 of V-shape wherein the open side of the V is closed by means of a web or plate 79. In Fig. 7, the V-shaped cross member is not illustrated, and the upper and lower pivotal connections as seen differ mainly in illustration because the cross plate member 79 is removed to show details of the lower pivotal connection.

Referring to Figs. 8 and 9 particularly, each of the trunnions 76 has pivotal threaded engagement with a hexagonal internally threaded bushing 81, and this bushing is held in a hexagonal opening 82 formed by complementary recesses in the plate 79 and in a separate bracket plate 83 that is secured to the plate by means of bolts 84 and 85. The bolts 85 extend through a flange portion of the V-shaped cross member 78, and since this is not deformed or shaped, but only the plate 79 shaped to form the hexagonal opening, spacers 86 are used as shown by Fig. 9 between the flange portion of the V-shaped cross member and the depressed portions of the plate 79 at each side of the hexagonal opening. Each of the bushings 81 is held against rotation by reason of the shape of the bushing and the opening therefor, and is held positively against axial movement by knurling one or more corners of the bushing, as indicated at 88 in Figure 7, so as to have biting engagement with the stampings that clamp around the bushing.

Each of the threaded bearings is adapted to be lubricated by a grease fitting 89 accessible through an opening 90 in the bracket plate 83 and which is threaded through the wall of the bushing 81 at a point beyond the end of the trunnion 76. The inner end of each bushing is closed by means of a Welch plug 91, and accordingly grease forced through the fitting is forced outwardly along the threaded bearing. A rubber or other sealing gasket 92 extends around the trunnion beyond the outer end of the bushing so as to prevent lubricant from escaping, and to prevent dirt from entering the bearing.

With the cross plate 79 already in place since it forms a part of the frame structure, assembly of the arms 70 and 71 and pivotally connecting them to the frame is not difficult. The bushings are threaded on the trunnions, and then the arms and bushings are disposed in the semihexagon recesses in the plate 79, and following this the bracket plates 83 are bolted in place. It will be appreciated that assembly of the parts in this way leaves the threaded bearings free from any binding.

Various pivotal connections other than that shown in Fig. 7 at the outer end of the arms may be employed but the one illustrated is simple and desirable. In this case the arm 70 has an integral trunnion 93 that is externally threaded and this trunnion projects through a tapered opening 94 in the arm 71. Intermediate the arms the trunnion has a pivotal threaded bearing engagement with a bushing 95, and this bushing has external locking threads and a head 96 that lock the bushing in the lower end of a wheel mounting member such as the member 21 shown by Fig. 1. Lubricant in this case is forced into the threaded bearing by means of a grease fitting 97 communicating with axial and radial openings extending to the threaded bearing area. Rubber rings or gaskets 98 and 99 may be provided at the ends of the bushing so as to seal the lubricant in the bearing and prevent dirt from entering it. It will be noted that the outer end of the trunnion as seen in Fig. 7 has threaded engagement with a conical bushing 100, which is axially split at one point and this bushing is adapted to be drawn into the conical opening 94 by a nut 101 engaging the outer side of the arm 71 and threaded on the trunnion. This arrangement enables locking the trunnion tightly in the arm 71 against any axial or radial movement, it being understood that as the conical bushing is drawn into the opening it contracts about the trunnion and tightly grips it.

The construction shown by Figs. 10 and 11 generally is similar to that shown by Fig. 7 with the principal exception that rubber bushings are employed in place of the threaded bearings. In this case the plate 79 forming a part of the frame is shaped to provide a circular opening 102, although this opening tapers to a smaller diameter at its outer end. A bracket 103 having a recess complementary to the opening in the plate 79 is bolted thereto in the same manner as shown by Figure 9. Each of the arms 70 and 71 terminates in a trunnion 104 which tapers to a larger diameter at its inner end and between each trunnion and the opening therefor a rubber bushing 105 is provided which is of the same character as that described in connection with the upper arm shown by Figure 4. The assembly of this construction is effected in substantially the same way as described in connection with the upper arm with the exception that one of the stampings forms a part of the framework of the vehicle.

In all of the constructions illustrated it is apparent that a simple and inexpensive arrangement is provided owing partly to the fact that shaped or stamped sheet metal members are employed that are not difficult and expensive to fabricate. In the instance where the arrangements includes fabrication of the sheet metal plate forming a part of the frame, a simpler arrangement is provided in that one side of the pivotal connection is a part of the frame structure that is normally present in the automobile. In the case of the threaded pivotal bearing, it is apparent that by placing the bushings on the threaded trunnions first and then merely laying the assembly in the opening provided for the bushing, no binding of threads can be present for the reason that they are disposed in position when in a nonbinding relation. The arrangement wherein rubber bushings are employed facilitates assembly of these bushings with the trunnion and with the framework of the vehicle, and it is apparent that a tapered bushing and trunnion may be readily utilized owing to the manner in which the parts may be assembled. In general, the several forms of the invention promote simplicity in design, manufacture and assembly, while at the same time they provide structures which are durable and highly efficient in use.

Although more than one form of the invention has been described and illustrated in detail, it will be apparent to those skilled in the art that various modifications may be made without departing from the scope of the appended claims.

What is claimed is:

1. The combination with a motor vehicle frame including a cross sheet metal frame member, a wheel supporting arm projecting laterally from the frame and having a trunnion on its inner end that projects longitudinally of the vehicle, bearing means receiving the trunnion and including a portion of the cross frame shaped to provide a trunnion receiving recess, and a bushing in such recess to directly engage the trunnion, said bushing being internally threaded and the trunnion being externally threaded and having pivotal threaded bearing engagement with the bushing.

2. The combination with a motor vehicle frame, an arm projecting laterally from the frame and having wheel supporting means on its outer end and a trunnion projecting from its inner end and longitudinally of the vehicle, a sleeve on the frame receiving the trunnion, and a rubber bushing around the trunnion and between the wall of the sleeve and the trunnion, said trunnion being longitudinally tapered in shape with its smaller end next to the arm.

3. The combination with a motor vehicle frame, an arm projecting laterally from the frame and having wheel supporting means on its outer end and a trunnion projecting from its inner end and longitudinally of the vehicle, a sleeve on the frame receiving the trunnion, and a rubber bushing around the trunnion and between the wall of the sleeve and the trunnion, said trunnion, sleeve, and bushing being longitudinally tapered in shape with the smaller ends next to the arm, whereby any tendency of the trunnion to move axially out of the sleeve is resisted by compression of the rubber.

4. In combination with a motor vehicle frame, wheel carrying arm members projecting laterally from the frame and having trunnion elements projecting from their inner ends and towards each other longitudinally of the vehicle, means on the frame providing a recess for each trunnion, and a rubber bushing around each trunnion and within the recess, each of the trunnions and the recess therefor being longitudinally tapered in a direction from the inner end of the trunnion to its outer end.

5. In a motor vehicle, a joint between two members comprising a pair of sheet metal sections adapted to be secured on one member and having complementary recesses forming a journal opening, a trunnion on the second member and projecting into the opening, means securing the sections to the first member and comprising a bolt passing diametrically through the joined sections and securing them to the first member, and a spacer member around the bolt between the sections so as to allow tightening of the bolt without distorting the sections.

6. In a motor vehicle, sheet metal sections having complementary recesses providing spaced and aligned journal openings, internally threaded bushings in the openings respectively, wheel carrying arms projecting laterally from the center line of the vehicle, and externally threaded trunnions on the inner ends of the arms and having pivotal threaded engagement with the bushings respectively.

7. In a motor vehicle, sheet metal sections having complementary recesses providing spaced and aligned journal openings, said openings respectively tapering axially in opposite directions, rubber bushings in said openings, wheel carrying arms projecting laterally from the center line of the vehicle, and aligned trunnions on the inner ends of the arms and disposed respectively in said bushings, each of said trunnions being axially tapered similarly to the opening in which it is mounted.

8. The combination with a vehicle frame, a pair of wheel supporting arms extending laterally from the frame and having offset and axially aligned trunnions at their inner ends, means connecting the arms outwardly from said ends so as to provide a unitary arm structure, journal means providing axially aligned circumferentially open recesses of such character that the trunnions respectively may be laid in the recesses by movement transverse to the axis thereof, other journal means complementary to the first journal means and adapted jointly therewith to provide circumferentially complete recesses so that with the trunnions laid in the first partial recesses, the second journal means may be applied thereover and fastened to the first journal means so as to retain the trunnions against removal transversely of the axis, and means including bushings in the recesses and around the trunnions for substantially preventing axial movement of the trunnions in the recesses while permitting oscillatory movement thereof in the recesses, said last mentioned means being of such character that assembly of the journal means, bushings, and trunnions is prevented except by laying the trunnions in the first journal recesses and then applying the second journal means.

9. The combination with a vehicle frame, a pair of wheel supporting arms extending laterally from the frame and having offset and axially aligned trunnions at their inner ends, means connecting the arms outwardly from said ends so as to provide a unitary arm structure, journal means providing axially aligned circumferentially open recesses of such character that the trunnions respectively may be laid in the recesses by movement transverse to the axis thereof, other journal means complementary to the first journal means and adapted jointly therewith to provide circumferentially complete recesses so that with the trunnions laid in the first partial recesses, the second journal means may be applied thereover and fastened to the first journal means so as to retain the trunnions against removal transversely of the axis, bushings in the recesses and receiving the trunnions, means operatively holding each bushing in its recess against axial removal, and means operatively holding each trunnion against axial removal from its bushing, said last mentioned two means being of such character that assembly of the arm trunnions, journal means and bushings is prevented except by laying the trunnions in the first journal means and then applying the second journal means.

10. The combination with a vehicle frame a pair of wheel supporting arms extending laterally from the frame and having offset and axially aligned trunnions at their inner ends, means connecting the arms outwardly from said ends so as to provide a unitary arm structure, journal means providing axially aligned circumferentially open recesses of such character that the trunnions respectively may be laid in the recesses by movement transverse to the axis thereof, other journal means complementary to the first journal means and adapted jointly therewith to provide circumferentially complete recesses so that with the trunnions laid in the first partial recesses, the second journal means may be applied thereover and fastened to the first journal means so as to retain the trunnions against removal transversely of the axis, and means in the recesses and cooperating with the trunnions and journal means for substantially preventing axial removal of the trunnions, said last mentioned means being of such character that assembly of the arm trunnions and journal means is prevented except by laying the trunnions in the first journal means and then applying the second journal means.

11. The combination with a vehicle frame, a pair of wheel supporting arms extending laterally from the frame and having offset and axially aligned trunnions at their inner ends, means connecting the arms, means on the frame providing axially aligned recesses partially receiving the trunnions respectively with the recesses of such character that the trunnions may be laid in the recesses by movement transverse to the axes thereof, bushings on the trunnions adapted to seat in the recesses respectively, and cover means adapted to be fastened to the recess providing means and jointly forming with the latter complete recesses receiving the bushings and closely fitting the latter.

12. The combination with a vehicle frame, a pair of wheel supporting arms extending laterally from the frame and having offset and axially aligned trunnions at their inner ends, means connecting the arms, means on the frame providing axially aligned recesses partially receiving the trunnions respectively with the recesses of such character that the trunnions may be laid in the recesses by movement transverse to the axes thereof, and cover means adapted to be fastened to the recess providing means and jointly forming with the latter complete recesses receiving the trunnions.

13. The combination with a motor vehicle frame including a cross sheet metal frame member forming a rigid part of the frame, a wheel supporting arm projecting laterally from the frame and having a trunnion on its inner end that projects longitudinally of the vehicle, bearing means pivotally receiving the trunnion so that the arm can swing upwardly and downwardly relative to the frame and including a portion of the cross member shaped to provide a trunnion receiving recess, a bushing in such recess to directly engage the trunnion, and a sheet metal bracket element secured to the frame and having a recess complementary to the recess in the cross member, the parts being so constructed and arranged that movement of the trunnion longitudinally of the bearing substantially is prevented.

14. In a motor vehicle, a joint between two members comprising a pair of metal sections on one member having complementary recesses forming a journal opening, an internally threaded bushing held in the recesses, an externally threaded trunnion on the other member with the trunnion having pivotal threaded bearing engagement with the internal threads of the bushing, said bushing having its outer surface polygonal in shape and the journal opening being of similar shape so as to hold the bushing against turning, and means for holding the bushing against axial movement in the opening.

15. In a motor vehicle, a joint between two members comprising a pair of metal sections on one member having complementary recesses forming a journal opening, an internally threaded trunnion on the other member with the trunnion having pivotal threaded bearing engagement with the internal threads of the bushing, said bushing having its outer surface polygonal in shape and the journal opening being of similar shape so as to hold the bushing against turning, and means for holding the bushing against axial movement in the opening, said bushing being of uniform external dimensions throughout its length.

JOHN W. LEIGHTON.